(12) United States Patent
Walker

(10) Patent No.: US 7,011,353 B2
(45) Date of Patent: Mar. 14, 2006

(54) AUTOMOBILE WINDSHIELD UMBRELLA

(76) Inventor: Delores Doris Walker, 10326 Bon Oak Dr., St. Louis, MO (US) 63136

( * ) Notice: Subject to any disclaimer, the term of this patent is extended or adjusted under 35 U.S.C. 154(b) by 0 days.

(21) Appl. No.: 10/646,001

(22) Filed: Aug. 22, 2003

(65) Prior Publication Data

US 2005/0040666 A1 Feb. 24, 2005

(51) Int. Cl.
 *B60J 11/00* (2006.01)
(52) U.S. Cl. ............... 296/95.1; 296/97.1; 160/370.21; 135/88.07
(58) Field of Classification Search ............... 296/95.1, 296/97.1, 99.1; 160/370.21, DIG. 3; 135/88.05, 135/88.07
 See application file for complete search history.

(56) References Cited

U.S. PATENT DOCUMENTS

| | | | | |
|---|---|---|---|---|
| 2,528,903 A | * | 11/1950 | Nichols | 296/95.1 |
| 2,570,399 A | * | 10/1951 | Smith | 296/95.1 |
| 3,088,772 A | * | 5/1963 | Francis | 296/95.1 |
| 3,279,845 A | * | 10/1966 | Lutz | 296/95.1 |
| 4,229,035 A | * | 10/1980 | Newman | 296/95.1 |
| 4,848,827 A | * | 7/1989 | Ou | 296/99.1 |
| 4,950,020 A | * | 8/1990 | Chen | 296/95.1 |
| 6,276,742 B1 | * | 8/2001 | Deng et al. | 296/95.1 |
| 6,425,623 B1 | * | 7/2002 | Nakayama | 296/95.1 |

* cited by examiner

*Primary Examiner*—Joseph D. Pape
(74) *Attorney, Agent, or Firm*—Charles C. McCloskey

(57) ABSTRACT

The windshield umbrella is a safety device designed to yield the maximum visibility in poor weather conditions. In inclement weather, the unit protrudes from the top of any windshield to serve as a shield and drainage device. It is wind-resistant and can be retracted when not in use or removed completely for easy storage. The windshield umbrella can be available as a permanent remote operated unit with roof harness or as a completely removable self-mounted unit.

2 Claims, 4 Drawing Sheets

AUTOMOBILE WINDSHIELD UMBRELLA

BACKGROUND OF THE INVENTION

The present invention relates to an automotive accessory in general and more particularly to an umbrella like device to protect the vision of a driver while driving in severe heavy rainstorms, hail, sleet, or the like. This device also shades an automobile windshield from the sun.

DESCRIPTION OF THE PRIOR ART

The patent to Nakayama, U.S. Pat. No. 6,425,623 shows a retractable visor for an automobile windshield. The visor housing mounts to a roof and occupies nearly the entire roof. In one embodiment, the visor has a spring at the rear and a cable system at the front to extend the visor. In another embodiment, the visor winds upon a roll attached to the roof above the windshield and unrolls by pulling towards stays upon the hood of the automobile. Another embodiment shows the visor extending downward from a housing. The visor and housing have complementary arcuate shapes. In contrast, the present invention has an umbrella that extends upward and above the windshield of an automobile. Unlike '623, the present invention permits a sunroof in an embodiment. The present invention also covers a minor portion of the windshield unlike the '623 patent.

SUMMARY OF THE INVENTION

The windshield umbrella can be used on any motor vehicle such as a car, van, bus, or the like. The present invention acts as a safety device to improve the visibility for the motorist during heavy rainstorms or inclement weather. In use, the umbrella of the present invention protects the windshield from excessive rain, hail, sleet and the like. The present invention provides a clearer view of the road for a motorist and lessens the risk of accidents due to poor visibility. Further, the present invention lowers the need for motorists to pull off the road due to impaired vision during inclement weather.

The present invention joins to the roof of a motor vehicle or automobile as either a permanent device or a temporary device. The permanent device retracts the umbrella into a harness upon command of the motorist. The temporary, or self-mounting, device mounts to the roof upon brackets and retracts as desired by the motorist. In good weather, the motorist can retract the umbrella into the harness of the permanent device or remove the temporary device for storage within an automobile.

Further, the umbrella resists wind encountered during operation of an automobile. However, the present invention does not replace windshield wipers. Windshield wipers accommodate ordinary rain as normal flow. Windshield wipers in conjunction with the present invention accommodate heavier precipitation, or a deluge. In general, the present invention reduces vision impairment of motorists caused by excessive rainfall upon a windshield during downpours, thunderstorms, hurricanes, and the like.

There has thus been outlined, rather broadly, the more important features of the invention in order that the detailed description thereof that follows may be better understood and that the present contribution to the art may be better appreciated. Additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide a new and improved automobile windshield umbrella.

Another object is to provide such an automobile windshield umbrella that is easy to assemble and to connect to an automobile roof.

A further object is to provide such an automobile windshield umbrella that retracts and extends as desired by a motorist or as warranted by the weather.

A still further object is to provide such an automobile windshield umbrella that resists the wind and aerodynamic forces.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

The same reference numerals refer to the same parts throughout the various figures.

Description of the Preferred Embodiment

Figure 5:
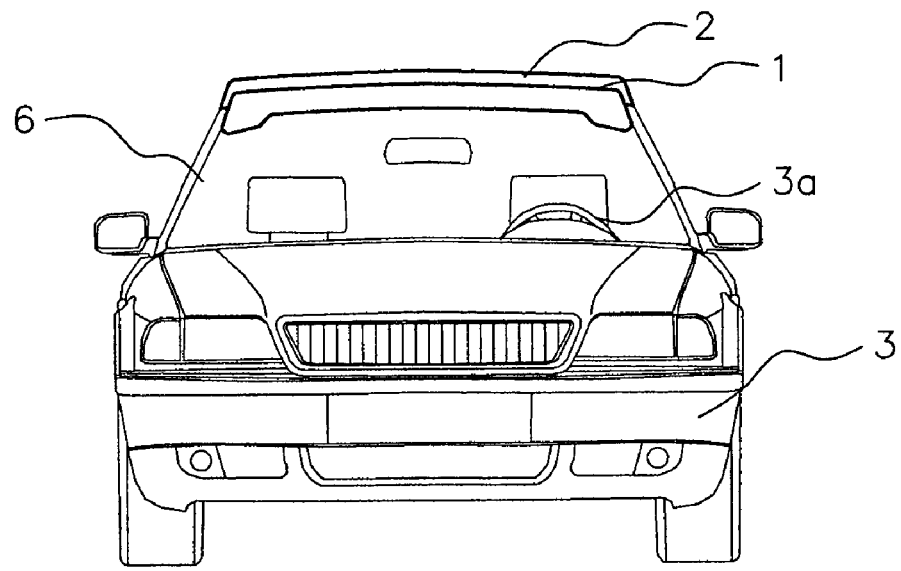
FIG. 5 shows a front view of an automobile though with the permanent embodiment of the present invention installed.
Figure 6:
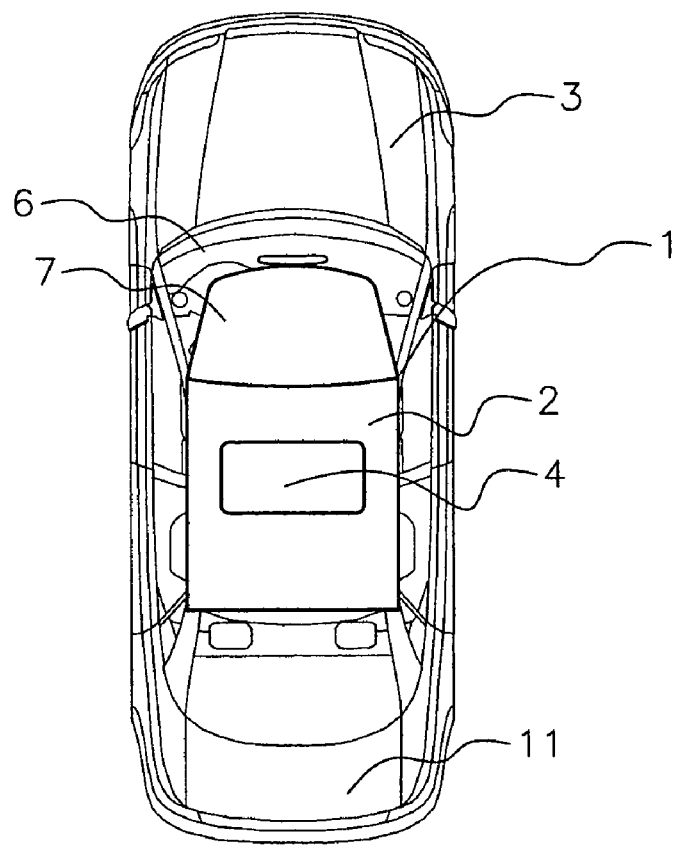
FIG. 6 reveals the top view of the roof of an automobile with the permanent embodiment.
Figure 7:
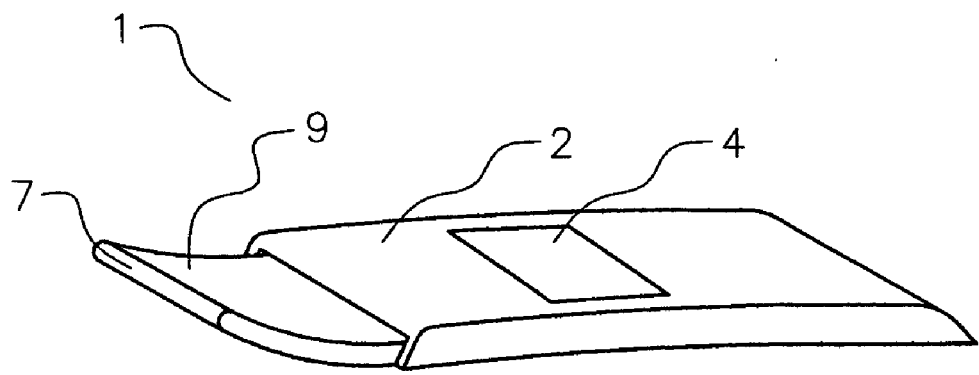
FIG. 7 illustrates the components of the permanent embodiment of the present invention; and, FIG. 8 shows a side view of an automobile with the permanent embodiment of the present invention installed.
Figure 8:
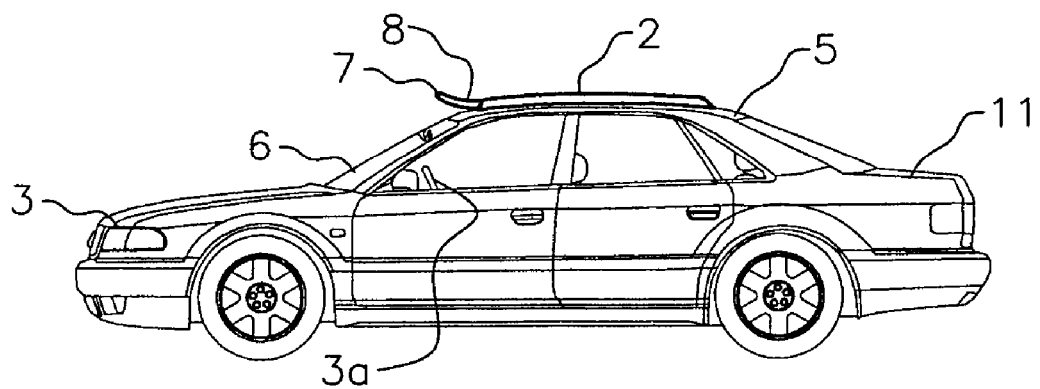

In the preferred embodiment as a permanent device, the present invention 1 will be a remote-operated, retractable unit with a harness 2 on top of a car 3, which will house the umbrella 7 as shown in FIG. 5. The present invention 1 will also have an optional sunroof 4 as seen in FIG. 6. Retraction is controlled electrically via steering column or dashboard access 3a as shown in FIG. 8. FIG. 8 then shows the present invention 1 in the retracted position 8. The preferred embodiment will extend the length of the roof 5 as shown in FIG. 6. The umbrella 7 will be as wide as the windshield 6 to partially cover and block rain downpours, sleet, or the like as shown in FIGS. 5 and 6. It will extend out and over the windshield 6 at least 10–12 inches as shown in FIG. 8. The umbrella 7 will curve upward about 2½ inches to force heavy rain backward and to the side of the windshield 6 and away from the view of the motorist as shown in FIG. 7. FIG. 7 then shows the windshield umbrella when in use or the extended position 9.

Figure 1:
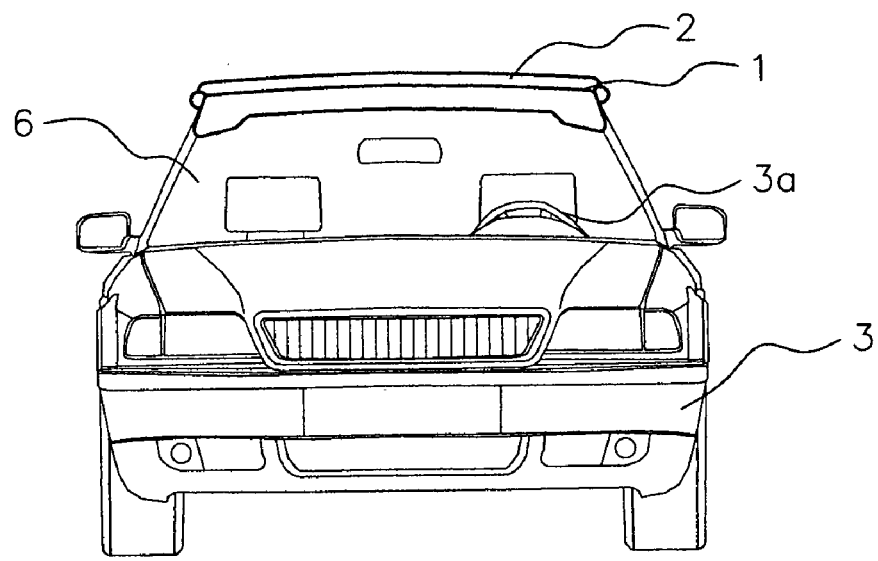
FIG. 1 shows a front view of an automobile with the temporary embodiment of the present invention installed.
Figure 2:
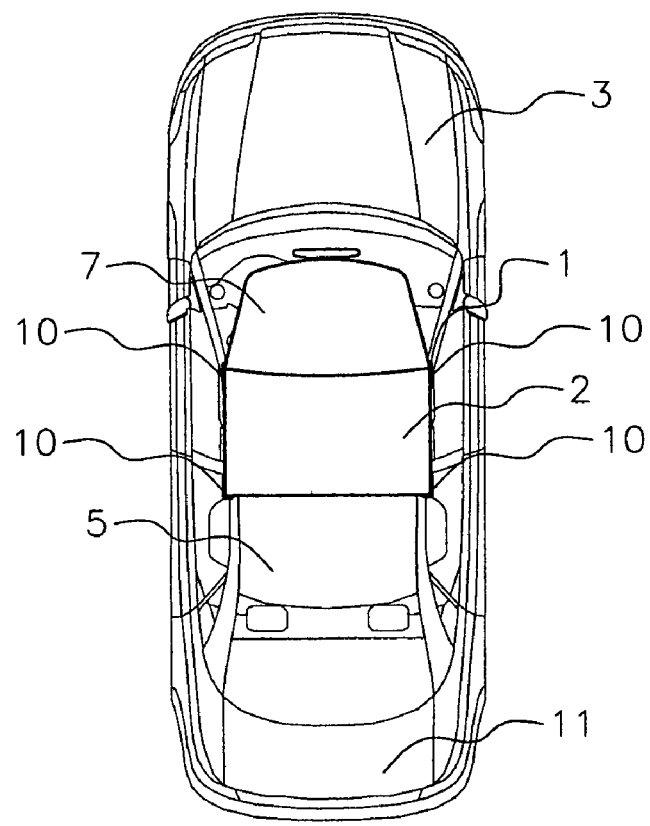
FIG. 2 shows a top view of the roof of an automobile with the temporary embodiment.
Figure 3:
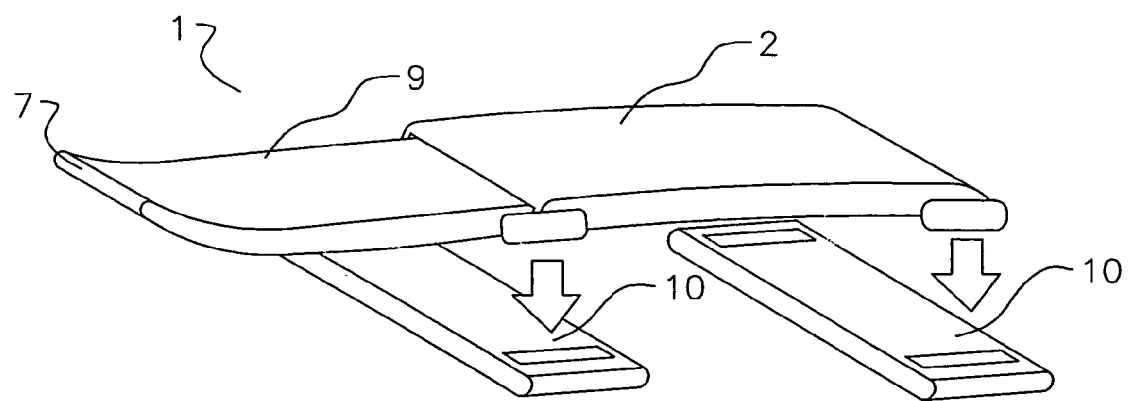
FIG. 3 illustrates an exploded view of the components of the present invention.
Figure 4:
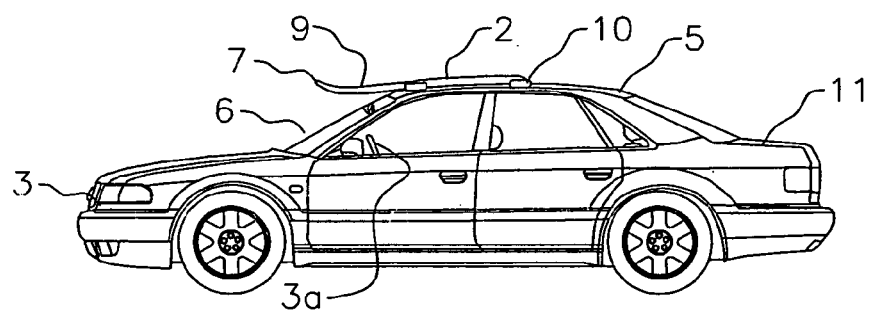
FIG. 4 describes a side view of an automobile with the temporary embodiment of the present invention fully extended.

For an alternate embodiment as a temporary device, the windshield umbrella 1 will be a completely removable unit. The umbrella 7 is manually mounted into the mounting brackets 10 as shown in FIG. 3, then pulled out of, or extended from, the harness or pushed, or retracted, into the harness, and manually detached and stored in trunk when not in use as shown in FIG. 1. The windshield umbrella 1 can also be attached manually by mounting the harness 2 into the brackets 10 on the roof 5 of the automobile 3 as shown in FIGS. 3 and 4. FIG. 2 is a top view of the windshield umbrella 1. FIG. 4 is a side view of the windshield umbrella 1 in an extended position for the temporary device.

The umbrella 7 will be as wide as the windshield 6 to partially cover and block rain downpours as shown in FIGS. 1 and 2. It will extend out and over the windshield 6 at least 10–12 inches. The umbrella 7 will curve upward about 2½ inches to force heavy rain onto the back of the automobile, to the side of the windshield and away from the view of the driver as shown in FIG. 3.

This windshield umbrella 1 can also be used as a sun shade. As a sun shade it will reduce the amount of heat and ultraviolet light entering through the windshield 6 as describe in FIG. 4.

The automobile windshield umbrella and its component parts are constructed of but not limited to, lightweight, fibrous polymer composites reinforced with a steel frame of high shear strength, and non-oxidizing alloy brackets.

From the aforementioned description, an automobile windshield umbrella has been described. The windshield umbrella is uniquely capable of diverting heavy rain from a windshield of an automobile. The windshield umbrella and its various components may be manufactured from many materials including but not limited to polymers.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

The invention claimed is:

1. A device to divert rainwater from an automobile windshield comprising:
   an umbrella, generally trapezoidal in shape and extending upwardly from said windshield;
   two or more brackets connected to the roof of an automobile; and,
   a harness for storing said umbrella, said harness being temporarily mounted upon said brackets;
   whereby, a motorist extends or retracts said umbrella within said harness as needed due to the weather;
   whereby, a motorist removes said umbrella and said harness when not needed during good weather and stores said umbrella and said harness within an automobile.

2. The device to divert rainwater of claim 1 further comprising:
   said umbrella curving upward at least two inches above the roof of an automobile and extending outward at least ten inches from the joint of the roof and the windshield of an automobile.

* * * * *